March 27, 1945.  M. FAURE  2,372,372
SHOPPING CART
Filed Aug. 21, 1943  2 Sheets-Sheet 1
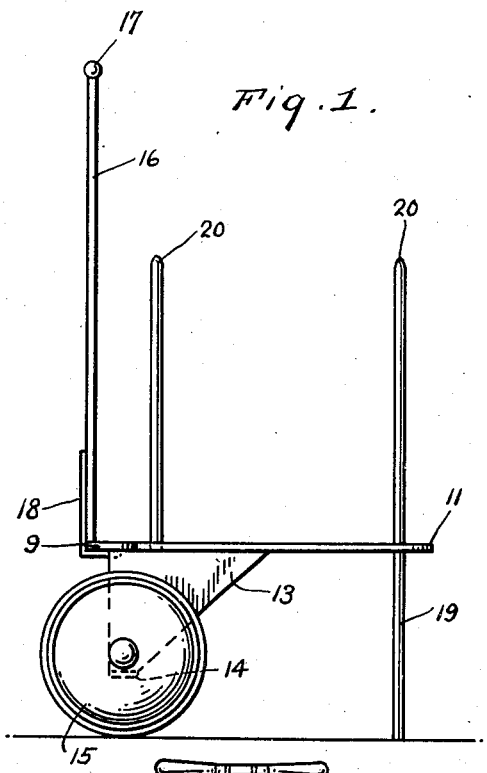
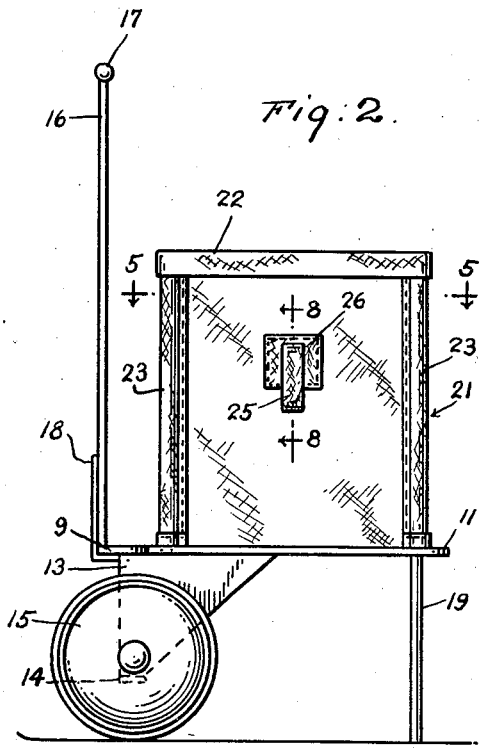
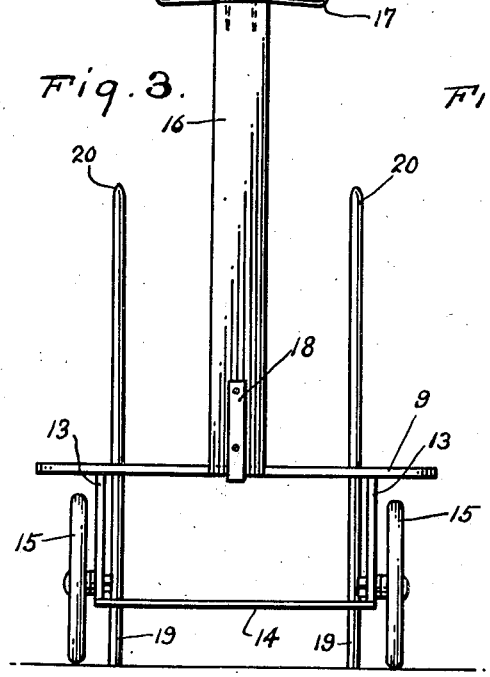
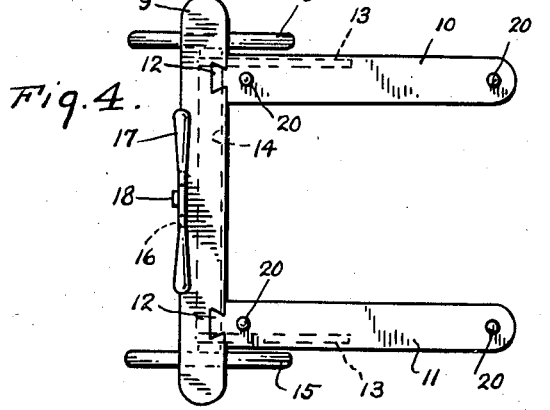
Inventor
Marthe Faure
By Clarence A. O'Brien
and Harvey B. Jackson
Attorneys March 27, 1945.  M. FAURE  2,372,372
SHOPPING CART
Filed Aug. 21, 1943  2 Sheets-Sheet 2
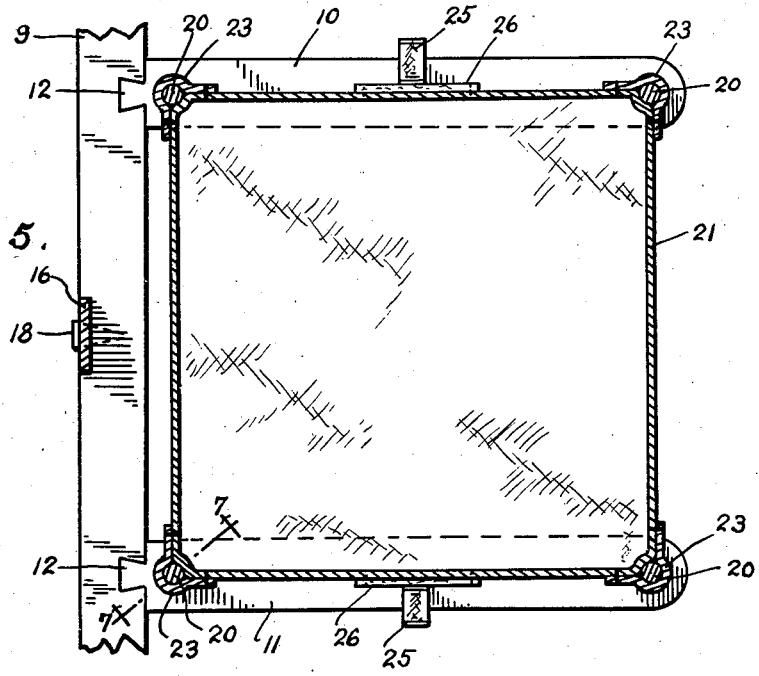
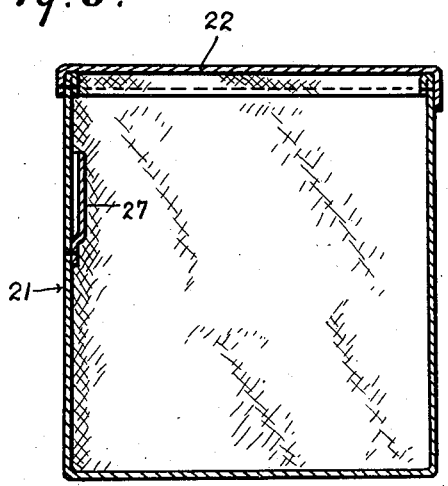
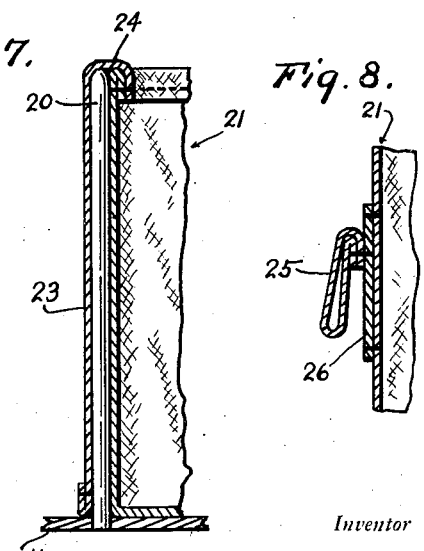
Inventor
Marthe Faure
By Clarence A. O'Brien
and Harvey B. Jacobson
Attorneys Patented Mar. 27, 1945

2,372,372

UNITED STATES PATENT OFFICE 2,372,372

SHOPPING CART

Marthe Faure, Tulsa, Okla.

Application August 21, 1943, Serial No. 499,569

1 Claim. (Cl. 280—51)

This invention relates to a novel and improved shopping cart which, while usable in and around the home for miscellaneous purposes, is primarily adapted to aid one in conveniently handling and carrying groceries and the like home from nearby neighborhood and community stores.

As of the time of this writing grocery stores, being short-handed, are in many instances, resorting to cash-and-carry methods of transacting business. Therefore, the present day housewife is confronted with the difficulty of transporting heavy and often burdensome bundles and grocery loads. With this in mind, I have evolved and produced a clever, easy to handle and use, light weight but nevertheless efficient and durable cart, the same being characterized by an appropriate receptacle, wheeled supporting means and a maneuvering handle.

In carrying out the principles of the invention, I have found it expedient and practicable to adopt a combination cart and canvas bag, the cart being made in such a manner as to permit a canvas bag to be readily applied and removed.

It is also an object to provide a structure which is simple and economical, one which is susceptible of manufacture from non-essential and non-critical war materials, the adaptation employed being aptly fitted to serve intended purposes.

Other features and advantages will become more readily apparent from the following description and the accompanying illustrative drawings.

In the drawings, wherein like numerals are employed to designate like parts throughout the same:

Figure 1 is a side elevational view of the cart per se, this constructed in accordance with the principles of the present invention, Figure 2 is a side elevation similar to Figure 1 with the detachable canvas or equivalent article-carrier bag in position.

Figure 3 is a rear end elevation of Figure 1, that is, a view observing the structure in a direction from left to right.

Figure 4 is a top plan view of the structure seen in Figures 1 and 3.

Figure 5 is a horizontal section, on an enlarged scale, on the plane of the line 5—5 of Figure 2.

Figure 6 is a vertical section through the bag per se.

Figure 7 is a section on the plane of the line 7—7 of Figure 5.

Figure 8 is an enlarged detail section on the line 8—8 of Figure 2.

The carrier cart may be constructed of light weight readily available material, principally wood, though some of the details may be of available metal stock. However, the matter of material is immaterial, so to speak, so far as the structural novelty, in its broadest sense, is concerned. The cart comprises a horizontal main frame piece 9 having outstanding parallel limbs 10 and 11 connected thereto by appropriate mortise and tenon joints 12. Depending perpendicularly from the U-shaped frame made up of the parts 9, 10 and 11 are appropriate wheel hangers 13 of general triangular form, these being connected together by a horizontal cross-piece 14. The wheels 15 are of suitable construction and appropriately mounted on the adapters or hangers 13. A handle 16 rises vertically from the intermediate portion of the rear frame-piece 9 and this is provided with handle bars 17 at the upper end. An appropriate L-shaped bracket or brace 18 serves to secure the handle to the frame structure.

It will be observed that the vertical legs 19 are secured to and depend from the outer free end portions of the arms or limbs 10 and 11. These are of a height to coact with the wheels in maintaining the cart in a horizontal standing position, when not in use, as shown in the drawings. Rising vertically from the inner and outer end portions of the limbs 10 and 11 are duplicate uprights 20. It will be noted that I provide four of these and that they are arranged in pairs and serve to accommodate the detachable canvas or equivalent bag 21. The upper ends of the uprights are rounded off but slightly pointed to facilitate easy application and removal of said bag.

The bag is a four-walled affair with a suitable bottom and an appropriate closing cover 22. Extra flaps 23 are stitched along vertical edges to the corner portions of the bag and cooperate with the corners in defining vertically elongated pockets, these to accommodate the stick-like uprights 20. The pockets are easily slipped down over the uprights to hold the bag distended for cenvenient use. Calling attention to Figure 7, it will be observed that the flaps forming the pockets are extended in and over to provide closing caps, as indicated at the point 24. This is to prevent the bag from collapsing or drooping down as would otherwise be the case. I also call attention to the hand loops 25, these being suitably attached to opposite side walls of the bag by appropriately stitched and reinforcing patches 26. The handles facilitate lifting and carrying the bag from place to place in the home or elsewhere.

Briefly, I desire to stress the provision of a wheeled, U-shaped frame tiltable from a horizontal, inclined position, whereby to permit it to be placed in a stationary position, as shown in the drawings, or tilted back for conveyance purposes. This U-shaped frame is provided with an appropriately arranged and properly balanced handle for pushing and maneuvering the cart. The pegs or uprights 20 conveniently accommodate the readily applicable and removable canvas bag and serve to hold the bag distended when in use.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

In a shopping cart, a U-shaped frame including a relatively wide and flat rear transverse bar and spaced relatively wide and flat side bars rigid with and projecting forwardly from the end portions of said rear bar, a flat substantially vertical handle rigidly fixed at its lower end to the rear edge of said rear bar intermediate the ends of the latter, vertical hanger plates fixed at their upper edges to the under sides of said side bars at the rear ends of the latter, means rigidly connecting the lower ends of said plates, co-axial supporting wheels journaled on the lower rear portions of said plates upon axes disposed transversely of the frame, legs fixed to and depending from the forward ends of said side bars and adapted to engage the ground to coact with the supporting wheels in supporting the frame in a substantially horizontal position, and rigid bag distending and supporting posts fixed to and rising from the front and rear ends of said side bars.

MARTHE FAURE.